(12) United States Patent
Eng

(10) Patent No.: US 6,408,970 B1
(45) Date of Patent: Jun. 25, 2002

(54) CAB SUSPENSION SYSTEM FOR TERMINAL TRACTORS

(76) Inventor: Allen L. Eng, 713 Knights Bridge Rd., Edmond, OK (US) 73034

( * ) Notice: Subject to any disclaimer, the term of this patent is extended or adjusted under 35 U.S.C. 154(b) by 0 days.

(21) Appl. No.: 09/648,425

(22) Filed: Aug. 28, 2000

(51) Int. Cl.[7] .............................. B62D 33/06; B60J 7/00
(52) U.S. Cl. ................................ 180/89.12; 180/89.13; 180/89.19; 280/124.164; 280/124.177; 280/124.179; 188/274; 188/299; 296/190.07; 267/275; 267/294
(58) Field of Search .......................... 180/89.13, 89.12, 180/89.19; 280/124.177, 124.179, 124.164; 296/190.07; 188/299, 274; 267/275, 294

(56) References Cited

U.S. PATENT DOCUMENTS

| | | | | |
|---|---|---|---|---|
| 3,741,581 A | * | 6/1973 | Patrin | 280/124.179 X |
| 3,964,151 A | * | 6/1976 | Thrasher | 188/274 X |
| 4,144,978 A | | 3/1979 | Drake | |
| 4,186,914 A | | 2/1980 | Radwill | |
| 4,294,324 A | * | 10/1981 | Kimball et al. | 180/89.14 |
| 4,341,397 A | * | 7/1982 | Morimura et al. | 280/688 |
| 4,502,673 A | * | 3/1985 | Clark | 188/299 |
| 4,568,067 A | * | 2/1986 | Iwata | 280/668 |
| 4,609,230 A | * | 9/1986 | McCann | |
| 4,756,516 A | * | 7/1988 | Tondato | 280/688 |
| 4,871,189 A | | 10/1989 | Van Breemen | |
| 4,877,222 A | * | 10/1989 | Davis | 188/274 |
| 5,209,316 A | | 5/1993 | Bauer | |
| 5,249,652 A | | 10/1993 | Leitzman | |
| 5,253,853 A | | 10/1993 | Conaway | |
| 5,396,973 A | * | 3/1995 | Schwemmer et al. | 188/299 |
| 5,454,550 A | * | 10/1995 | Christopherson | 188/287 X |
| 5,580,075 A | * | 12/1996 | Turner et al. | 267/294 |
| 5,590,733 A | | 1/1997 | Ljungholm | |
| 5,613,665 A | * | 3/1997 | Lund | 267/274 |
| 5,775,469 A | * | 7/1998 | Kang | 267/275 |
| 5,893,330 A | * | 4/1999 | Emery | 180/124.179 |
| 5,964,310 A | * | 10/1999 | Gylliner | 180/89.13 X |
| 6,073,714 A | | 6/2000 | McHorse | |
| 6,086,076 A | | 7/2000 | Prem | |
| 6,135,434 A | * | 10/2000 | Marking | 188/315 |

FOREIGN PATENT DOCUMENTS

| | | | | |
|---|---|---|---|---|
| DE | 2242109 | * | 3/1973 | 180/89.14 |
| DE | 2447933 | * | 4/1976 | 180/89.14 |
| EP | 0247295 | * | 12/1987 | 180/89.14 X |

OTHER PUBLICATIONS

Brochure: Centaur II Terminal Tractor; Crane Carrier Company Terminal Tractor Division.

* cited by examiner

Primary Examiner—Lanna Mai
Assistant Examiner—Toan C To
(74) Attorney, Agent, or Firm—Ronald D. Homburg

(57) ABSTRACT

The invention is a mechanical suspension system for cab-over tractors, specifically those used in terminal transport having two front cushion dual suspension components on the front pivot area of the cab to tractor frame connection and a single rear cushion dual suspension component on the rear of the tractor frame at the cab-over latch area, the three point dual suspension system providing a more stable suspension package than the four point and other single suspension systems.

5 Claims, 8 Drawing Sheets

CAB SUSPENSION SYSTEM FOR TERMINAL TRACTORS

CROSS REFERENCE TO RELATED APPLICATIONS

None

I. BACKGROUND OF THE INVENTION

1. Field of Invention

The invention is a mechanical suspension system for cab-over tractors, specifically those used in terminal transport of semi-trailers having two front cushion dual suspension components on the front pivot area of the cab to tractor frame connection and a single rear cushion dual suspension component on the rear of the tractor frame at the cab-over latch area, the three point dual suspension system providing a more stable suspension package than the four point and other currently available suspension systems.

2. Description of Prior Art

The following United States patents are disclosed herein and incorporated into this application for utility patent. All relate to suspension systems for heavy duty trucks or trains. A primary application for this current invention is for terminal tractors as disclosed in the brochure attached to the Form 1449, from Crane Carrier Company, or CCC®.

A suspension system for a vehicle cab including springs and a sway resisting torsion bar is disclosed in U.S. Pat. No. 6,073,714 to McHorse, et al. which is provided to minimize lateral sway of the cab, primarily through use of a bushing or a singular spring and the torsion bar. A combination spring/shock absorber is disclosed in U.S. Pat. No. 5,590,733 to Ljungholm, et al. in which four shock absorbers with external springs are provided to cushion the cab of a tractor truck, also employing a second shock absorber on a lateral arm for diagonal reinforcement and suspension. A vibration dampening shock absorber is disclosed in U.S. Pat. No. 5,253,853 to Conaway, et al.

A two stage dampening shock absorber is disclosed in U.S. Pat. No. 5,249,652 to Leitzman, et al., which provides a primary force dampener with a second, stronger force dampener within the single shock absorber. U.S. Pat. No. 5,209,316 to Bauer and U.S. Pat. No. 4,871,189 to Van Breemen both disclose suspension systems using air springs, an air reservoir, shock absorbers and height control valves. A dual spring suspension system for railroad cars, having an inner coil spring with an additional stronger outer coil spring is disclosed in U.S. Pat. No. 4,186,914 to Radwill, et al.

II. SUMMARY OF THE INVENTION

The primary objective of the invention is to provide a terminal tractor cab suspension system employing a three point suspension system having each point containing a dual directional suspension system for absorption of both upward and downward forces exerted on the cab.

Most terminal tractors are built with the rear axle mounted directly to the frame, referred to as a "hard tail" or "solid mount" which indicates the lack of a flexible rear suspension system on the chassis. These vehicles are known to create a hard ride with operator discomfort and maintenance cost increase to the vehicle. Rough terrain transfers shock loading to the cab causing the cabin to pitch, roll and backslap the driver throughout operation.

Figure 1:
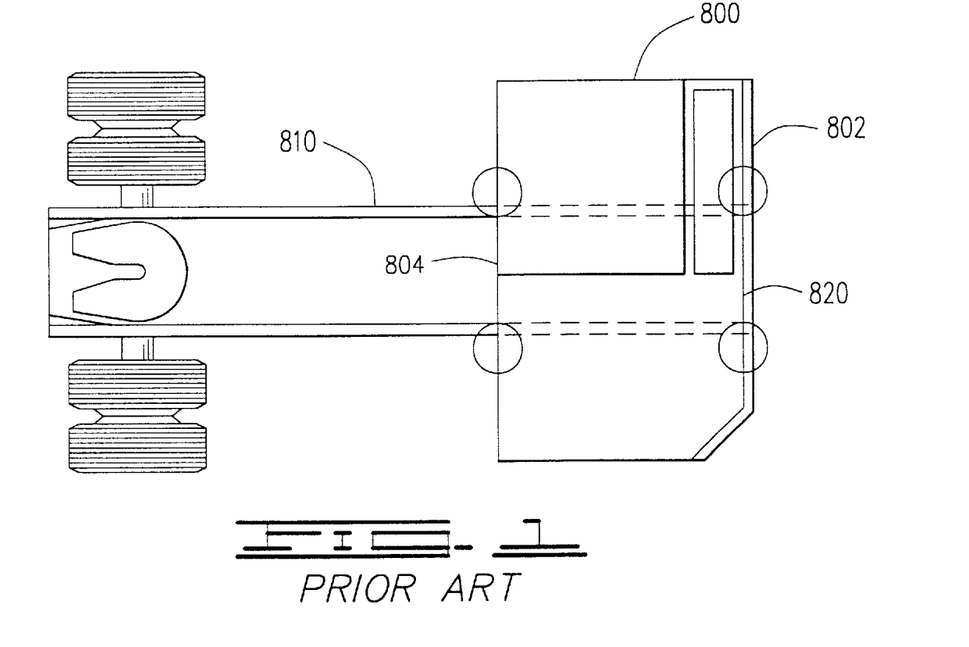
FIG. 1 is a drawing of the prior art of a typical terminal tractor with a four point suspension mounting, indicating front and rear cab mount locations.
Figure 2:
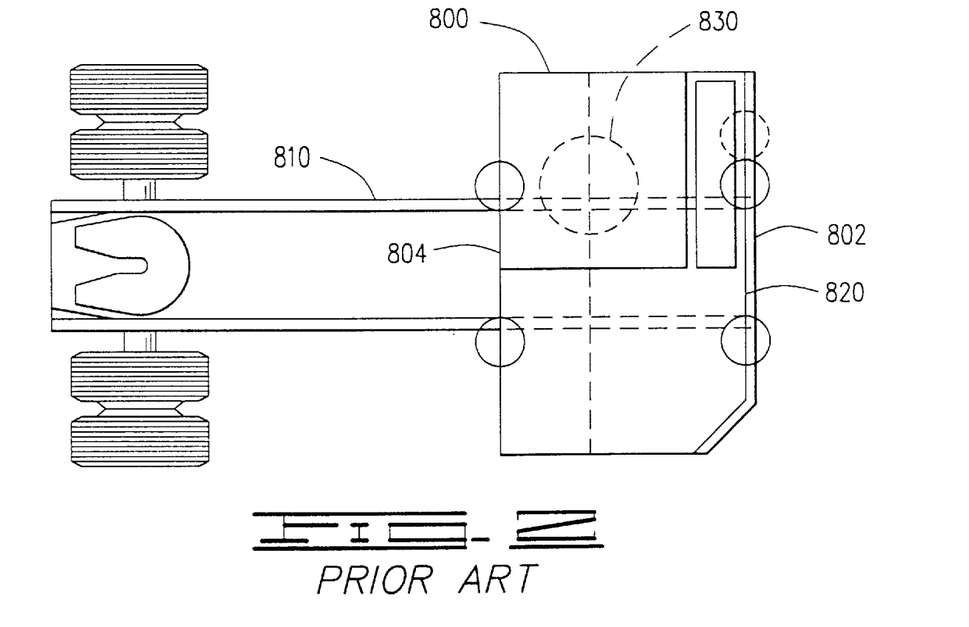
FIG. 2 is a drawing of the prior art of a typical terminal tractor indicating a typical center of mass of the cab structure.

The industry standard four point mounting system has two front mounts allowing the cabs to tilt forward for maintenance. This prior art is shown in FIGS. 1 and 2 of the drawings. They are typically rubber bushings enclosed in steel sleeves with cap screws or pins inserted through the canters of the bushings to create the pivot point. Very limited movement is obtained by the rubber bushings and achieve less than ¼ inch movement relative to the chassis. Virtually all pitch and roll movement of the chassis is transferred to the cab, causing the cabin to be thrown at every bump.

The rear mounts of the four point mounting system are rubber pads, cushions or rubber dock bumpers at both frame rails under the rear of the cab. They too are stiff and apply less than ¼ inch deflection to cushion the ride. The cab bucks up and forward every time a bump is hit and the constant pitch, roll, bump and bucking of the cab leads to premature failure of all involved components. Electrical systems fail, connections vibrate loose, terminals crack and separate, lamps burn out or rupture, switches and resistors fail and motor life is shortened.

Major terminal tractor manufacturers have tried for years to develop a rear suspension system that would provide the flexibility to improve ride character and be adaptable for full and empty loading conditions, and durable for high cycle terminal applications. Air suspensions are expensive and difficult to maintain in terminal applications. Additionally, terminal tractor cabs do not adapt well to highway tractor applications because most, if not all, terminal tractors have the offset cab configuration where the majority of the cab is left of center, thus providing an offset balance of the cab design, making the four point system center of gravity not anywhere near the center of gravity of the terminal tractor cab, which is generally nearest the left frame rail. Major imbalances and stresses result from the application of these four point systems to the left set terminal tractor applications.

Figure 3:
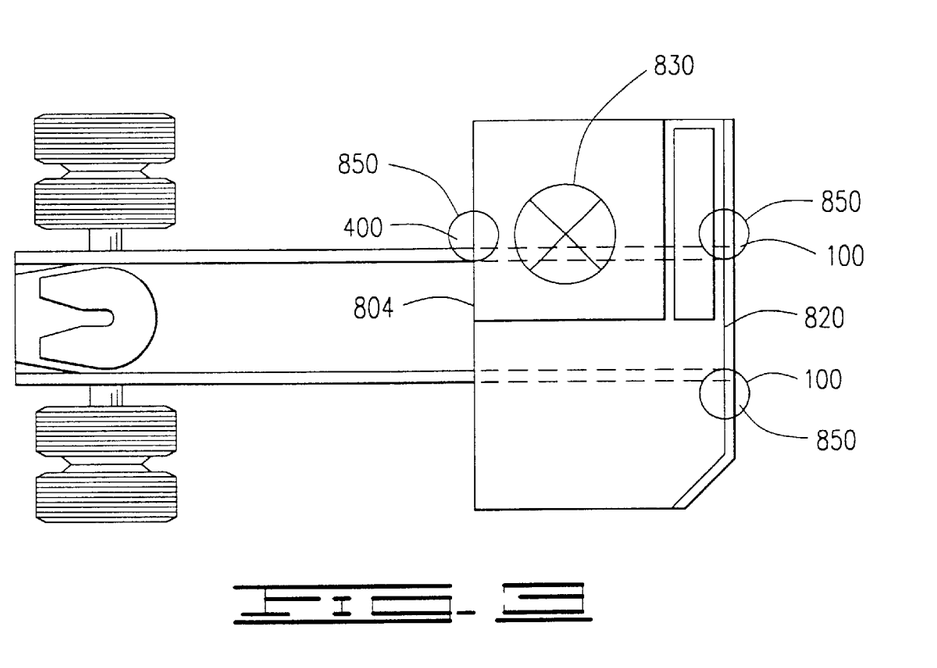
FIG. 3 is a drawing of the three point suspension mounting of the current invention on a typical terminal tractor, with center mass indicated.

The current invention employs a three point suspension system, as shown in FIG. 3 of the drawings. The two front mounts pivot to allow the cab to tilt for maintenance. The single rear mount will be located in the most advantageous place to balance the mass of the cab effectively between the three mounts. The center of gravity is approximately located at the operator's seat, the most neutral location within the cab. No unbalanced forces are applied to the cab using this three point system. This invention addresses the problems of high vertical accelerations and torsional stresses by significant reduction of vertical stresses and some horizontal stresses, by maintaining a more stable static condition of the cab to the tractor frame, by placement of the center of gravity under the operator of the terminal tractor, and by providing an upward and downward suspension system for active operation employing three springs in each single unit—a heavy spring for downward force reduction comprising approximately 90% of the vertical accelerations associated with normal operations, a lighter spring for upward stress reduction and negative accelerations (bucking) and an elastomeric spring for extremely hard forces, comprising about 10% of the forces incurred in normal operation or observed in very poor terrain, each applied between a stainless steel shaft and a steel sleeve operating as a single unit, two units applied to the front of the terminal tractor cab which are pivotal and a third inverted unit applied to the rear of the cab which is detachable for pivoting the cab for maintenance and repair.

III. DESCRIPTION OF THE DRAWINGS

The following drawings are submitted with this utility patent application.

IV. DESCRIPTION OF THE PREFERRED EMBODIMENT

The invention, as shown in FIGS. 3–10 of the drawings, is a three point terminal tractor cab suspension system mounted to the frame of the terminal tractor comprising two front suspension assemblies 100 and one rear suspension assembly 400. Each front suspension assembly 100, as shown in FIGS. 5a, 5b of the drawings, includes a support shaft 120, a sleeve assembly 200, a carrier coil spring 260, a rebound coil spring 250, a pivot bushing assembly 370, an elastomeric spring 360 and a carrier housing assembly 300. These front suspension assemblies 100 are identical and are mounted to a front 802 of a terminal tractor 800 attaching a terminal tractor cab 820 to a terminal tractor frame 810 providing for pivot of the cab 820 for maintenance and repair access.

Figure 4A:
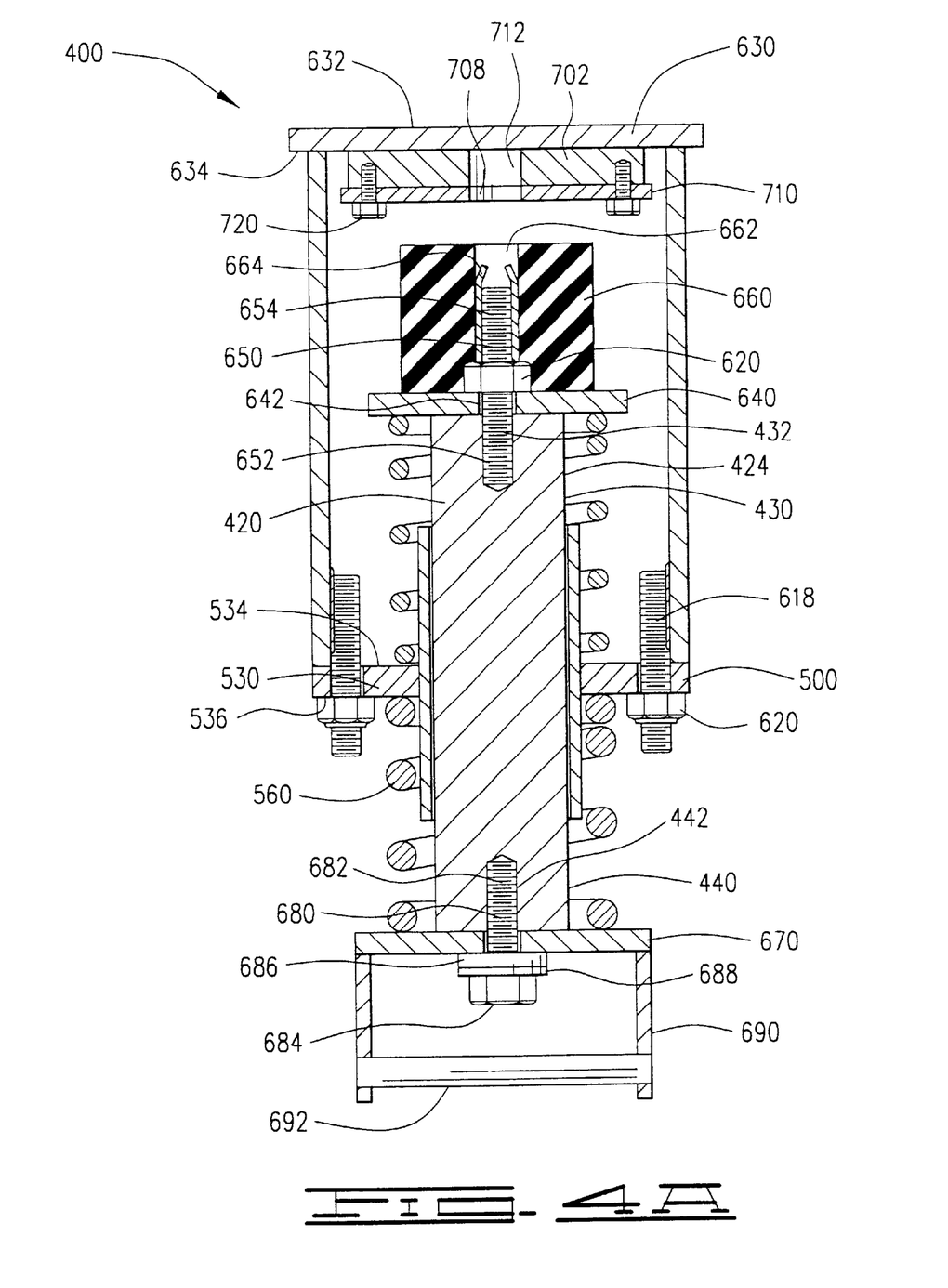
FIGS. 4a and 4b are drawings of a cross section of a rear mount assembly.
Figure 4B:
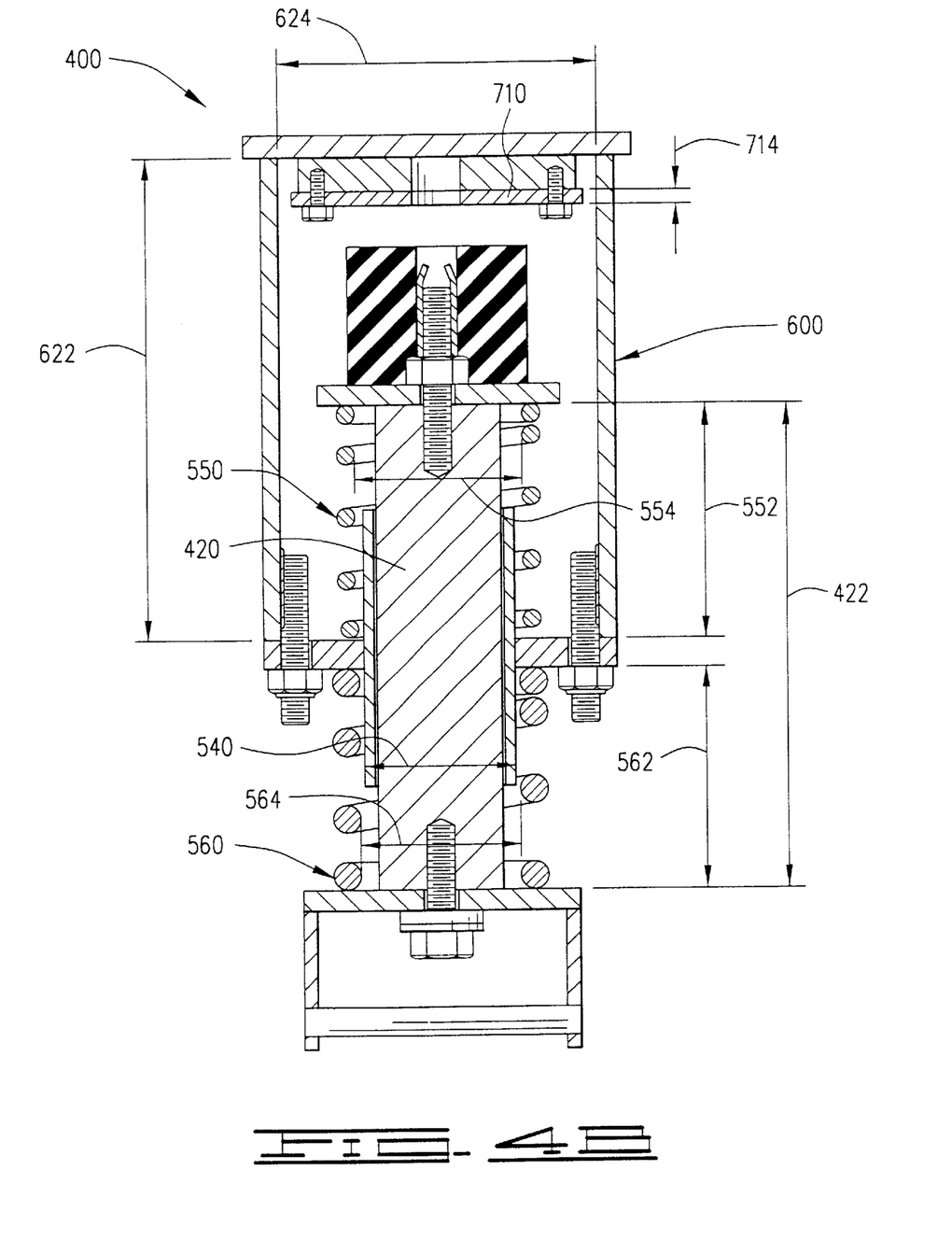

The rear suspension assembly 400, as shown in FIGS. 4a, 4b of the drawings, includes a support shaft 420, a sleeve assembly 500, a rebound coil spring 550, a carrier coil spring 560, an elastomeric spring 660, a latch catch assembly 670 and a carrier housing assembly 600. The rear suspension assembly 400 is mounted to a left rear 804 of the terminal tractor 800 releaseably attaching the cab 820 to the frame 820 of the terminal tractor 800.

Figure 5A:
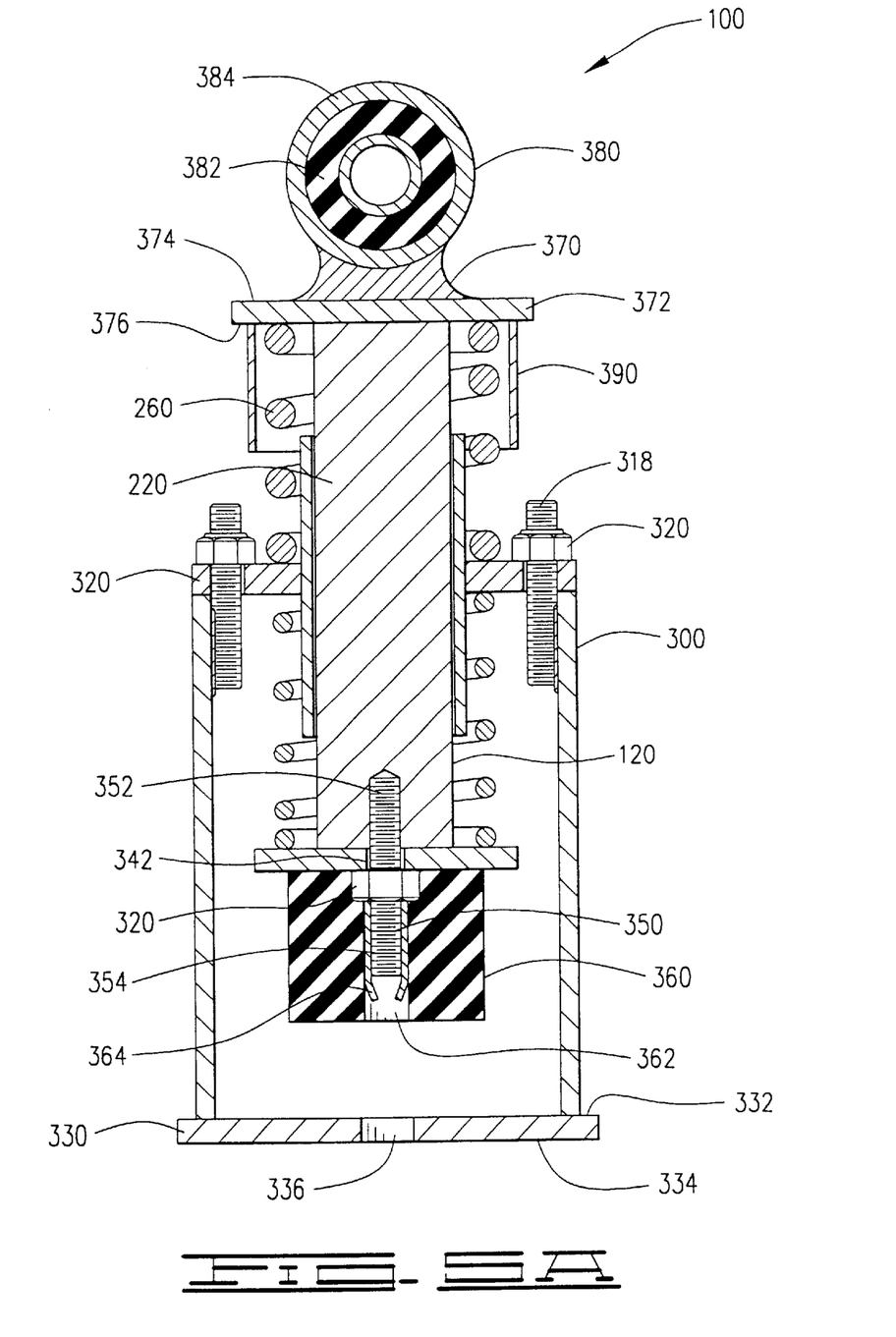
FIGS. 5a and 5b are drawings of a cross section of a front mount assembly.
Figure 5B:
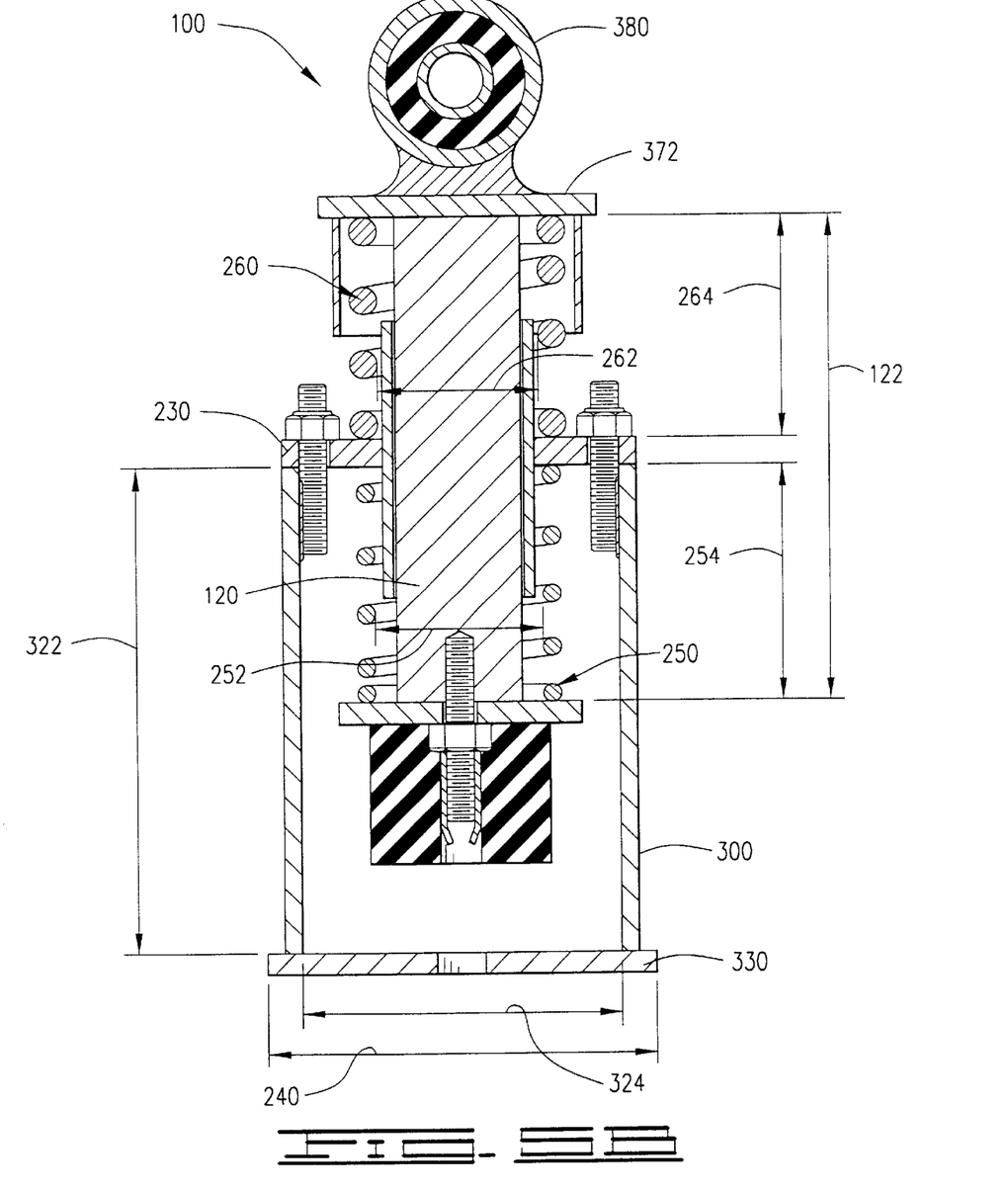

The support shaft 120 of the front suspension assembly 100 is a solid metal cylindrical shaft having a length 122 and a smooth outer surface 124. The support shaft 120 has a first end 130 which contains a central threaded capture stud anchor hole 132. The support shaft 120 also has a second end 140.

Figure 6:
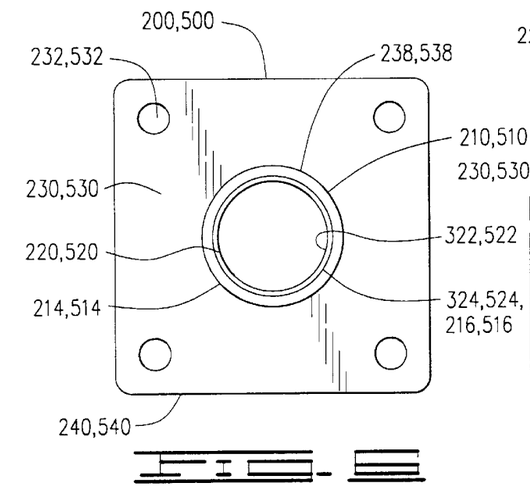
FIG. 6 is a drawing of the top view of the sleeve assembly for both the front suspension assembly and the rear suspension assembly.
Figure 7:
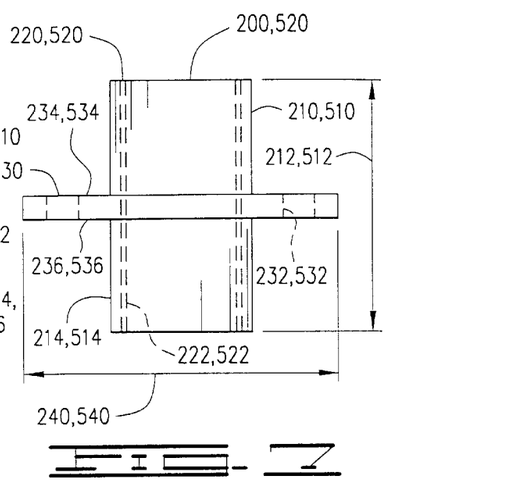
FIG. 7 is a drawing of the side view of the sleeve assembly for both the front suspension assembly and the rear suspension assembly.

The sleeve assembly 200 of the front suspension assembly 100, as shown in FIGS. 6 and 7 of the drawings, includes a cylindrical vertical sleeve 210, a sleeve mounting plate 230 having four sleeve retainer stud holes 232 and a cylindrical sleeve bushing 220 having a friction resisting inner surface 222 and an outer surface 224. The cylindrical vertical sleeve 210 has a length 212, an outer surface 214, and an inner surface 216 within which the cylindrical sleeve bushing 220 is inserted, thus providing a tight contacting fit between the outer surface 224 of the cylindrical sleeve bushing 220 and the inner surface 216 of the cylindrical vertical sleeve 210. The length 212 of the cylindrical vertical sleeve 210 is substantially less than the length 122 of the support shaft 120. The sleeve mounting plate 230 has an upper surface 234, a lower surface 236, a diameter 240 and a central vertical sleeve bore 238 within which the outer surface 214 of the cylindrical vertical sleeve 210 is welded. The sleeve assembly 200 is slidably engaged with the support shaft 120, having the friction resisting inner surface 222 of the cylindrical sleeve bushing 220 in contact with the smooth outer surface 124 of the support shaft 120 along the length 122 of the support shaft 120.

The carrier coil spring 260 of the front suspension assembly 100 is a heavy duty coil spring having an inner diameter 262 suited to rest upon the upper surface 234 of the sleeve mounting plate 230 over the outer surface 214 of the cylindrical vertical sleeve 210. This carrier coil spring 260 has a very heavy coil tension, and has a length 264 which is slightly more than one half the length 122 of the support shaft 120.

The rebound coil spring 250 of the front suspension assembly 100 is also a heavy duty coil spring, but in a preferred embodiment, has a coil tension less than the carrier coil spring 260. The rebound coil spring 250 has an inner diameter 252 suited to rest against the lower surface 236 of the sleeve mounting plate 230 over the outer surface 214 of the cylindrical vertical sleeve 210. The rebound coil spring 252 has a length 254 which is approximately one half the length 122 of the support shaft 120.

The carrier housing assembly 300 of the front suspension assembly 100 includes a carrier housing 310, having an upper end 312, a lower end 314, and an inner surface 316 to which a plurality of threaded sleeve retainer studs 318 are welded at the upper end 312, projecting beyond such upper end 312. These threaded sleeve retainer studs 318, preferably four, are configured on the carrier housing 310 to extend through the sleeve retainer stud holes 232 in the sleeve mounting plate 230 of the sleeve assembly 200, where such threaded sleeve retainer studs 318 are fastened to the sleeve mounting plate 230 by lock nuts 320.

The carrier housing assembly 300 of the front suspension assembly 100 also includes a housing end plate 330 having an upper surface 332 and a lower surface 334, such housing end plate 330 is welded to the lower end 314 of the carrier housing 310. This housing end plate 330 has a central bore 336 from its upper surface 332 to its lower surface 334.

An inner capture plate 340 having a central bore 342 is attached to the first end 130 of the support shaft 120 by a threaded capture stud 350 having an insertion end 352 and an extending end 354, the insertion end 352 inserted into the threaded capture stud anchor hole 132 extending through the central bore 342 of the inner capture plate 340 and held together by a lock nut 320 leaving a substantial portion of the extending end 354 of the threaded capture stud 350 extending beyond the lock nut 320. This inner capture plate 340 retains the rebound coil spring 250 on the first end 130 of the support shaft 120.

The elastomeric spring 360 is a thick ring elastomeric material having a central bore 362. The elastomeric spring 360 is attached over the extending end 354 of the threaded capture stud 350 through the central bore 362 of the elastomeric spring 360. A cylindrical capture stud sleeve 364 is placed over the remaining extending end 354 of the threaded capture stud 350 within the central bore 362 of the elastomeric spring 360 to prevent wear to the elastomeric spring 360 by the threaded capture stud 350. When the elastomeric spring 360 is compressed, in the event of an extremely heavy jar to the terminal tractor 800 to which the front suspension assemblies 100 are mounted, there is a potential for the extending end 354 of the threaded capture stud 350 to extend beyond the elastomeric spring 360 and forcibly contact the housing end plate 330. Provision is made for this potential impact by aligning the central bore 336 of the housing end plate 330 with the extending end 354 of the threaded capture stud 350, allowing such extending end 354 of the capture stud 350 to penetrate the housing end plate 330 in the event of such extraordinary impact.

The carrier housing 310 is also provided with a depth 322 which is more than the combined length of the assembled rebound coil spring 250, the inner capture plate 340 and the elastomeric spring 360 placed inside the carrier housing 310. The carrier housing 310 also has a diameter 324 at its lower end 314 which accepts the assembled rebound coil spring 250, the inner capture plate 340 and the elastomeric spring 360 when placed within the carrier housing 310. This diameter 324, however, is less than the diameter 340 of the sleeve mounting plate 330 which is placed upon the lower end 314 of the carrier housing 310 suspending the assembled support shaft 120, sleeve assembly 200, rebound coil spring 250, inner capture plate 340 and the elastomeric spring 360 suspended within the carrier housing 310 without the elastomeric spring 360 being in contact with the housing end plate 330.

Figure 9:
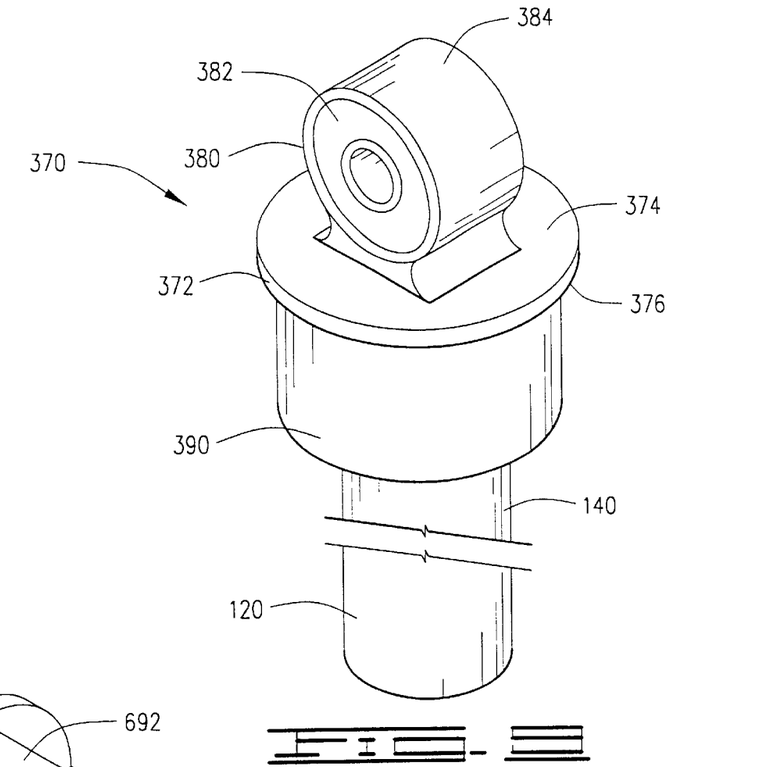
FIG. 9 is a drawing of the rubber pivot bushing with the steel sleeve on the support shaft for the front mount assembly.

The pivot bushing assembly 370, as shown in FIG. 9 of the drawings, is attached to the second end 140 of the support shaft 120. A pivot bushing 380 used in the pivot bushing assembly is standard in the industry. A mounting plate 372 having an upper surface 374 and a lower surface 376 is welded near the second end 140 of the support shaft 120. The mounting plate 372 retains the carrier coil spring 260 on the second end 140 of the support shaft 120. Above the upper surface 374 of the mounting plate 370 is attached the pivot bushing 380 having an inner rubber bushing 382 surrounded by a steel sleeve 384. This pivot bushing assembly 370 is the location where the terminal tractor cab 820 is pivotally attached to the invention 10. In a preferred embodiment, a cylindrical dust shield 390 is provided on the lower surface 376 of the mounting plate 372 to partially cover the exposed second end 140 of the support shaft 120 and the carrier coil spring 260 on such second end 140 of the support shaft 120.

These front suspension assemblies 100 are attached between the frame 810 of the terminal tractor 800 by attaching the lower surface 334 of the housing end plate 330 to the terminal tractor frame 810 and connecting the pivot bushing assembly 370 to the cab 820 of the terminal tractor 800. Two front suspension assemblies 100 will be attached to the terminal tractor frame 810 and terminal tractor cab 820 in locations on the front 802 of the terminal tractor 800 as far apart as practical. The carrier coil spring 260 thus is situated to minimize downward forces, the rebound coil spring 250 is situated to minimize upward forces, and the elastomeric spring 360 is provided to handle excessive downward forces in addition to the carrier coil spring 260.

The rear suspension assembly 400, again as shown in FIGS. 4a, 4b, 6–8 and 10 of the drawings, is substantially similar to the front suspension assembly 100, except that the rear suspension assembly 400 is basically inverted. The support shaft 420 of the rear suspension assembly 400 is a solid metal shaft having a length 422 and a smooth outer surface 424. The support shaft 420 has a first end 430 which contains a central threaded capture stud anchor hole 432 and a second end 440 which contains a central threaded stirrup retainer bolt hole 442.

The sleeve assembly 500 of the rear suspension assembly 400, as shown in FIGS. 6 and 7 of the drawings, includes a cylindrical vertical sleeve 510, a sleeve mounting plate 530 having four sleeve retainer stud holes 532 and a cylindrical sleeve bushing 520 having a friction resisting inner surface 522 and an outer surface 524. The cylindrical vertical sleeve 510 has a length 512, an outer surface 514, and an inner surface 516 within which the cylindrical sleeve bushing 520 is inserted, thus providing a tight contacting fit between the outer surface 524 of the cylindrical sleeve bushing 520 and the inner surface 516 of the cylindrical vertical sleeve 510. The length 512 of the cylindrical vertical sleeve 510 is substantially less than the length 422 of the support shaft 420. The sleeve mounting plate 530 has an upper surface 534, a lower surface 536, a diameter 540 and a central vertical sleeve bore 538 within which the outer surface 514 of the cylindrical vertical sleeve 510 is welded. The sleeve assembly 500 is slidably engaged with the support shaft 420, having the friction resisting inner surface 522 of the cylindrical sleeve bushing 520 in contact with the smooth outer surface 424 of the support shaft 420 along the length 422 of the support shaft 420.

The carrier coil spring 560 of the rear suspension assembly 400 is a heavy duty coil spring having an inner diameter 564 suited to rest against the lower surface 536 of the sleeve mounting plate 530 over the outer surface 514 of the cylindrical vertical sleeve 510. This carrier coil spring 560 has a very heavy coil tension. This carrier coil spring 560 is placed over the second end 440 of the support shaft 420 over the cylindrical vertical sleeve 510, in part. The carrier coil spring 560 has a length 562 which is more than one half the length 422 of the support shaft 420.

The rebound coil spring 550 of the rear suspension assembly 400 is also a heavy duty coil spring, but in a preferred embodiment, has a coil tension less than the carrier coil spring 560. The rebound coil spring 550 has an inner diameter 552 suited to rest upon the upper surface 534 of the sleeve mounting plate 530 over the outer surface 514 of the cylindrical vertical sleeve 510. The rebound coil spring 552 has a length 554 which is approximately one half the length 422 of the support shaft 420.

Figure 8:
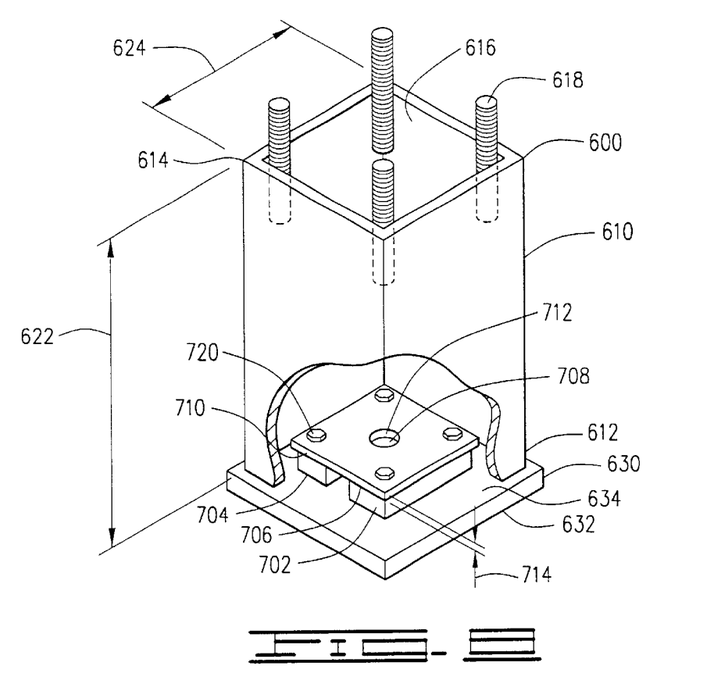
FIG. 8 is a drawing of the carrier housing assembly on the rear mount assembly.

The carrier housing assembly 600 of the rear suspension assembly 400, as shown in FIG. 8 of the drawings, includes a carrier housing 610 having an upper end 612, a lower end 614, and an inner surface 616 to which a plurality of threaded sleeve retainer studs 618 are welded to the lower end 614, projecting beyond such lower end 614. These threaded sleeve retainer studs 618, preferably four, are configured on the carrier housing 610 to extend through the sleeve retainer stud holes 532 in the sleeve mounting plate 530 of the sleeve assembly 500, where such threaded sleeve retainer studs 618 are fastened to the sleeve mounting plate 530 by lock nuts 620.

The carrier housing assembly 600 of the rear suspension assembly 400 also includes a housing end plate 630 having an upper surface 632 and a lower surface 634, such lower surface 634 of the housing end plate 630 welded to the upper end 612 of the carrier housing 610. The upper surface 632 of the housing end plate 630 is attached to the rear 804 of the terminal tractor cab 820 left of center on terminal tractor 800.

The lower surface 634 of the housing end plate 630 also contains a rebound plate assembly 700, fully contained within the carrier housing 610. This rebound plate assembly 700 comprises a rebound faceplate 702 having an upper surface 704, a lower surface 706 and a central bore 708, the upper surface 704 of the rebound faceplate 702 welded to the lower surface 634 of the housing end plate 630. To the lower surface 706 of the rebound faceplate 702 is a rebound spacer 710, also having a central bore 712, removeably attached to the rebound faceplate 702 by a plurality of bolts 720 into the lower surface 706 of the rebound faceplate 702. The rebound spacer 710 has a certain thickness 714, which in a preferred embodiment, several rebound spacers 710 of differing thickness 714 are supplied to be selected by the user for appropriate tensioning of the rear suspension assembly 400.

An inner capture plate 640 having a central bore 642 is attached to the first end 430 of the support shaft 420 of the rear suspension assembly 400 by a threaded capture stud 650 having an insertion end 652 and an extending end 654, the insertion end 652 inserted into the threaded capture stud anchor hole 432 extending through the central bore 642 of the inner capture plate 640 and held together by a lock nut 620 leaving a substantial portion of the extending end 654 of the threaded capture stud 650 projecting beyond the lock nut 620. This inner capture plate 640 retains the rebound coil spring 550 on the first end 430 of the support shaft 420.

The elastomeric spring 660 of the rear suspension assembly 400 is a thick ring elastomeric material having a central bore 662. The elastomeric spring 660 is attached over the extending end 654 of the threaded capture stud 650 through the central bore 662 of the elastomeric spring 660. A cylindrical capture stud sleeve 664 is placed over the remaining extending end 654 of the threaded capture stud 650 to prevent wear to the central bore 662 of the elastomeric spring 660 by the threaded capture stud 650. When the elastomeric spring 660 is compressed, in the event of an extremely heavy jar to the terminal tractor 800, there is a potential for the extending end 654 of the threaded capture stud 650 to extend beyond the elastomeric spring 660 and forcibly contact the housing end plate 630 and the rebound plate assembly 700. Provision is made for this potential impact by aligning the central bore 712 of the rebound spacer 710 and the central bore 708 of the rebound faceplate 702 with the extending end 654 of the threaded capture stud 650, allowing such extending end 654 of the threaded capture stud 650 to penetrate the aligned central bores 708, 712 of the rebound faceplate 702 and the rebound spacer 710 in an extraordinary impact.

The carrier housing 610 is also provided with a depth 622 which is more than the combined length of the assembled rebound coil spring 550, the inner capture plate 640 and the elastomeric spring 660 placed inside the carrier housing 610. The carrier housing 610 also has a diameter 624 at its lower end 614 which accepts the assembled rebound coil spring 550, the inner capture plate 640 and the elastomeric spring 660 when placed inside the carrier housing 610. This diameter 624, however, is less than the diameter 540 of the sleeve mounting plate 530 which is placed upon the lower end 614 of the carrier housing 610 suspending the assembled support shaft 420, sleeve assembly 500, rebound coil spring 550, inner capture plate 640 and the elastomeric spring 660 suspended within the carrier housing 610 without the elastomeric spring 660 being in contact with the rebound spacer 710.

Figure 10:
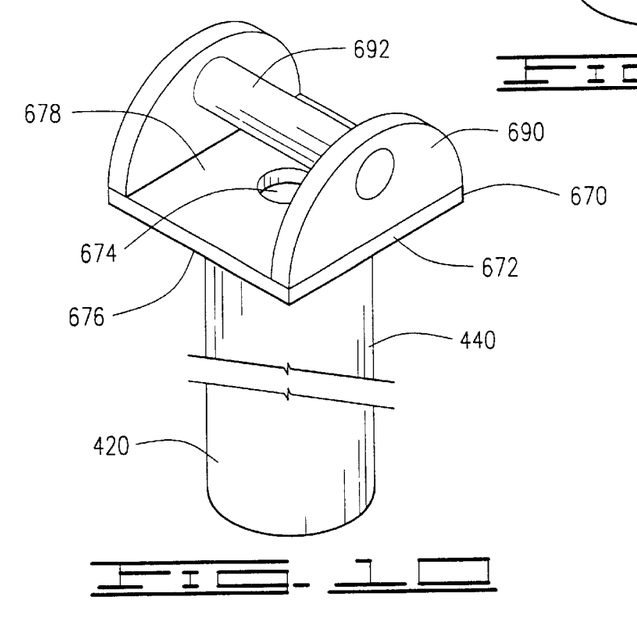
FIG. 10 is a drawing of the detachable latch bar assembly on the support shaft.

The latch catch assembly 670, as shown in FIG. 10 of the drawings, is attached to the second end 440 of the support shaft 420 of the rear suspension system 400. This latch catch assembly 670, which is a standard in the industry, comprises a latch plate 672 having a central bore 674, an upper surface 676 and a lower surface 678. The upper surface 676 of the latch plate 672 is attached to the support shaft 420 by a threaded stirrup retainer bolt 680, such threaded stirrup retainer bolt 680 having a rod end 682 and a head end 684, the rod end 682 of the stirrup retainer bolt 680 passing through the central bore 674 of the latch plate 672 engaging the threaded stirrup retainer bolt hole 442. An elastic washer spacer 686 and a flat washer 688 are secured by the head end 684 of the threaded stirrup retainer bolt 680 to affix the latch plate 672 against the second end 440 of the support shaft 420.

The lower surface 678 of the latch plate 672 is provided with a pair of parallel latch stirrups 690 extending away from the latch plate 672. Between the pair of latch stirrups 690 is a latch bar 692. Assembled, this latch catch assembly 670 is configured to engage an industry standard latch catch assembly lock mounted to the rear frame 810 of the terminal tractor 800.

Once the front suspension assemblies 100 and the rear suspension assembly 400 are applied to the terminal tractor 800, the terminal tractor cab 820 is suspended above the frame 810 of the terminal tractor 800 at three points of suspension 850, as shown in FIG. 3 of the drawings. These three points of suspension 850 are preferably situated on the frame 810 of the terminal tractor 800 to suspend the center of mass 830 of the cab 820 of the terminal tractor 800 at a location within a triangular region defined by the two front suspension assemblies 100 and the rear suspension assembly 400.

When the front of the terminal tractor 800 hits a bump or a hole in the travel surface, the front suspension assemblies absorb the major upward force on the front 802 of the terminal tractor 800 by the carrier coil spring 260 pressed between the upper surface 234 of the sleeve mounting plate 230 and the lower surface 376 of the pivot bushing mounting plate 372. Downward force is absorbed and relieved by the rebound coil spring 250 compressing between the inner capture plate 340 and the lower surface 236 of the sleeve mounting plate 230. For additional suspension, as previously mentioned, the elastomeric spring 360 provides an additional cushion between the inner capture plate 340 and the upper surface 332 of the housing end plate 330.

When the rear of the terminal tractor 800 hits that same bump, the rear suspension system 400 absorbs the major upward force with the carrier coil spring 560 between the lower surface 536 of the sleeve mounting plate 530 and the upper surface 676 of the latch plate 672, while the upward force is absorbed by the rebound coil spring 550 located between the inner capture plate 640 and the upper surface 534 of the sleeve mounting plate 530. Additional suspension is also provided for those extraordinary occasions of severe bumps by the elastomeric spring 660 cushioning the action between the rebound spacer 710 attached on the lower surface 706 of the rebound faceplate 702 and the inner capture plate 640.

On both the front suspension assemblies 100 and the rear suspension assembly 400, the sleeve assembly 200, 500 freely slides or floats on the support shaft 120, 420 allowing nearly complete absorption of energy by the carrier coil springs 260, 560, the rebound coil springs 250, 550 and the elastomeric spring 360, 660 with little energy absorbed or transferred to the support shafts 120, 420 or other non flexible components. This invention 10 may be supplied as an original market installation item or as an after market improvement to existing terminal tractors 800.

While the invention has been particularly shown and described with reference to a preferred embodiment thereof, it will be understood by those skilled in the art that changes in form and detail may be made therein without departing from the spirit and scope of the invention.

What is claimed is:

1. A three point terminal tractor cab suspension system mounted to the front frame and rear frame of a terminal tractor having a pivot cab, the three point terminal tractor cab suspension system comprising:
   a. two front suspension assemblies, including:
      1. a support shaft, having a smooth outer surface, a first end and a second end;
      2. a sleeve assembly, having cylindrical vertical sleeve with an inner surface and an outer surface, the inner surface containing an inner sleeve bushing, such inner sleeve bushing slidably engaging the smooth outer surface of the support shaft, the outer surface of the cylindrical vertical sleeve attached within a central vertical sleeve bore of a sleeve mounting plate, the sleeve mounting plate having an upper surface, a lower surface and sleeve retainer stud holes;
      3. a rebound coil spring placed upon the second end of the support shaft below the sleeve mounting plate, secured to such second end by an inner capture plate, the inner capture plate having a lower surface to which an elastomeric spring is affixed;
      4. a carrier coil spring placed upon the first end of the support shaft above the sleeve mounting plate, secured to such first end by a pivot bushing mounting plate having an upper surface to which a pivot bushing having an inner rubber bushing and an outer metal sleeve is attached; and
      5. a carrier housing having an upper end and a lower end, the upper end of the carrier housing attached to the lower surface of the sleeve mounting plate, the lower end of the carrier housing having a housing end plate having a central bore, wherein the support shaft, the carrier coil spring, the rebound coil spring, inner capture plate and the elastomeric spring are suspended within the carrier housing, the carrier housing end plate attaching to the front frame of the terminal tractor with the pivot bushing pivotally attached to the pivot cab of the terminal tractor; and
   b. a single rear suspension assembly
      1. a support shaft, having a smooth outer surface, a first end and a second end;
      2. a sleeve assembly, having cylindrical vertical sleeve with an inner surface and an outer surface, the inner surface containing an inner sleeve bushing, such inner sleeve bushing slidably engaging the smooth outer surface of the support shaft, the outer surface of the cylindrical vertical sleeve attached within a central vertical sleeve bore of a sleeve mounting plate, the sleeve mounting plate having an upper surface and a lower surface;
      3. a rebound coil spring placed upon the first end of the support shaft above the upper surface of the sleeve mounting plate, secured to such first end by an inner capture plate, the inner capture plate having an upper surface to which an elastomeric spring is affixed;
      4. a carrier coil spring placed upon the second end of the support shaft below the lower surface of the sleeve mounting plate, secured to such second end by a latch plate having a lower surface to which a latch catch assembly, having a pair of latch stirrups and a latch bar are attached; and
      5. a carrier housing having an upper end and a lower end, the lower end of the carrier housing attached to the upper surface of the sleeve mounting plate, the upper end of the carrier housing having a housing end plate having a lower surface to which a rebound faceplate and a rebound spacer are attached, wherein the support shaft, the carrier coil spring, the rebound coil spring, inner capture plate and the elastomeric spring are suspended within the carrier housing, the elastomeric spring situated directly below the rebound faceplate and rebound spacer, the carrier housing end plate attaching to the cab of the terminal tractor, with the latch assembly aligned above the rear frame of the and rebound spacer, the carrier housing end plate attaching to the cab of the terminal tractor, with the latch assembly aligned above the rear frame of the terminal tractor releaseably engaging a latch catch assembly lock mounted to the rear frame of the terminal tractor, the two front suspension assemblies and the rear suspension assembly suspending the pivot cab of the terminal tractor above the front and rear frame of the terminal tractor at three points of suspension.

2. The invention as disclosed in claim 1, further comprising the rebound coil spring having a coil tension less than the coil tension of the carrier coil spring.

3. The invention, as disclosed in claim 1, the front suspension assembly and the rear suspension assemblies further comprising:
   a. the front suspension assemblies including the second end of the support shaft having a central threaded capture stud sleeve anchor hole within which an insertion end of a threaded capture stud is placed, leaving an extending end of the threaded capture stud, to which the inner capture plate is attached through a central bore in the inner capture plate and upon which the elastomeric spring is applied through a central bore in the elastomeric spring, the central bore of the elastomeric spring lined with a cylindrical capture stud sleeve, such extending end of the threaded capture stud also located above a central bore within the housing end plate;
   b. the rear suspension assembly including the first end of the support shaft having a central threaded capture stud sleeve anchor hole within which an insertion end of a threaded capture stud is place, leaving an extending end of the threaded capture stud, to which the inner capture plate is attached through a central bore in the inner capture plate and upon which the elastomeric spring is applied through a central bore in the elastomeric spring, the central bore of the elastomeric spring lined with a cylindrical capture stud sleeve, such extending end of the threaded capture stud also located below an aligned central bore of the rebound faceplate and the central bore of the rebound spacer; and
   c. the upper end of the carrier housing in the front suspension assemblies and the lower end of the carrier housing in the rear suspension assembly have an inner surface to which a plurality of threaded carrier sleeve retaining studs are attached and aligned to engage a plurality of sleeve retainer stud holes in the sleeve mounting plate, attaching the sleeve mounting plate to the threaded sleeve mounting studs with lock nuts.

4. The invention, as disclosed in claim 1, further comprising the pivot bushing mounting plate on the front suspension assemblies having a lower surface to which a cylindrical dust shield is provided on the lower surface of the mounting plate to partially cover the second end of the support shaft and the carrier coil spring on such second end of the support shaft.

5. A three point terminal tractor cab suspension system mounted to the front frame and rear frame of a terminal tractor having a pivot cab, the three point terminal tractor cab suspension system comprising:

a. two front suspension assemblies, including:
      1. a support shaft, having a smooth outer surface, a first end and a second end;
      2. a sleeve assembly, having cylindrical vertical sleeve with an inner surface and an outer surface, the inner surface containing an inner sleeve bushing, such inner sleeve bushing slidably engaging the smooth outer surface of the support shaft, the outer surface of the cylindrical vertical sleeve attached within a central vertical sleeve bore of a sleeve mounting plate, the sleeve mounting plate having an upper surface, a lower surface and sleeve retainer stud holes;
      3. a rebound coil spring placed upon the second end of the support shaft below the sleeve mounting plate, secured to such second end by an inner capture plate, the inner capture plate having a lower surface to which an elastomeric spring is affixed;
      4. a carrier coil spring, having a coil tension greater than a coil tension of the rebound coil spring, the carrier coil spring placed upon the first end of the support shaft above the sleeve mounting plate, secured to such first end by a pivot bushing mounting plate having an upper surface to which a pivot bushing having an inner rubber bushing and an outer metal sleeve is attached the pivot bushing mounting plate also having a lower surface to which cylindrical dust shield is provided to partially cover the second end of the support shaft and the carrier coil spring on such second end of the support shaft; and
      5. a carrier housing having an upper end and a lower end, the upper end of the carrier housing attached to the lower surface of the sleeve mounting plate, the lower end of the carrier housing having a housing end plate having a central bore, wherein the support shaft, the carrier coil spring, the rebound coil spring, inner capture plate and the elastomeric spring are suspended within the carrier housing, the carrier housing end plate attaching to the front frame of the terminal tractor with the pivot bushing pivotally attached to the pivot cab of the terminal tractor, the front suspension assembly also including the second end of the support shaft having a central threaded capture stud sleeve anchor hole within which an insertion end of a threaded capture stud is placed, leaving an extending end of the threaded capture stud, to which the inner capture plate is attached through a central bore in the inner capture plate and upon which the elastomeric spring is applied through a central bore in the elastomeric spring, the central bore of the elastomeric spring lined with a cylindrical capture stud sleeve, such extending end of the threaded capture stud also located above a central bore within the housing end plate;

b. a single rear suspension assembly
      1. a support shaft, having a smooth outer surface, a first end and a second end;
      2. a sleeve assembly, having cylindrical vertical sleeve with an inner surface and an outer surface, the inner surface containing an inner sleeve bushing, such inner sleeve bushing slidably engaging the smooth outer surface of the support shaft, the outer surface of the cylindrical vertical sleeve attached within a central vertical sleeve bore of a sleeve mounting plate, the sleeve mounting plate having an upper surface and a lower surface;
      3. a rebound coil spring placed upon the first end of the support shaft above the upper surface of the sleeve mounting plate, secured to such first end by an inner capture plate, the inner capture plate having an upper surface to which an elastomeric spring is affixed;
      4. a carrier coil spring, having a coil tension greater than a coil tension of the rebound spring, the carrier coil spring placed upon the second end of the support shaft below the lower surface of the sleeve mounting plate, secured to such second end by a latch plate having a lower surface to which a latch catch assembly, having a pair of latch stirrups and a latch bar are attached; and
      5. a carrier housing having an upper end and a lower end, the lower end of the carrier housing attached to the upper surface of the sleeve mounting plate, the upper end of the carrier housing having a housing end plate having a lower surface to which a rebound faceplate and a rebound spacer are attached, wherein the support shaft, the carrier coil spring, the rebound coil spring, inner capture plate and the elastomeric spring are suspended within the carrier housing, the elastomeric spring situated directly below the rebound faceplate and rebound spacer, the carrier housing end plate attaching to the cab of the terminal tractor, with the latch assembly aligned above the rear frame of the terminal tractor releaseably engaging a latch catch assembly lock mounted to the rear frame of the terminal tractor, the rear suspension assembly also including the first end of the support shaft having a central threaded capture stud sleeve anchor hole within which an insertion end of a threaded capture stud is place, leaving an extending end of the threaded capture stud, to which the inner capture plate is attached through a central bore in the inner capture plate and upon which the elastomeric spring is applied through a central bore in the elastomeric spring, the central bore of the elastomeric spring lined with a cylindrical capture stud sleeve, such extending end of the threaded capture stud also located below an aligned central bore of the rebound faceplate and the central bore of the rebound spacer; and    c. the upper end of the carrier housing in the front suspension assemblies and the lower end of the carrier housing in the rear suspension assembly have an inner surface to which a plurality of threaded carrier sleeve retaining studs are attached and aligned to engage a plurality of sleeve retainer stud holes in the sleeve mounting plate, attaching the sleeve mounting plate to the threaded sleeve mounting studs with lock nuts, wherein the two front suspension assemblies and the rear suspension assembly suspend the pivot cab of the terminal tractor above the front and rear frame of the terminal tractor at three points of suspension.

\* \* \* \* \*